(12) United States Patent
Hamman et al.

(10) Patent No.: US 7,373,251 B2
(45) Date of Patent: May 13, 2008

(54) METHOD FOR PREDICTING QUANTITATIVE VALUES OF A ROCK OR FLUID PROPERTY IN A RESERVOIR USING SEISMIC DATA

(75) Inventors: Jeffry G. Hamman, Sugar Land, TX (US); Donald H. Caldwell, Houston, TX (US); Fabien Allo, Chiswick (GB); Raphael Bornard, Chiswick (GB); Thierry Coléou, Paris (FR); Thierry Crozat, London (GB); Bernard Deschizeaux, Richmond (GB); Yves Lafet, Paris (FR); Pierre Lanfranchi, Rambouillet (FR); Amélie Rodrigue Molle, Les Chapelles Bourbon (FR)

(73) Assignees: Marathon Oil Company, Houston, TX (US); Compagnie Generale de Geophysique, Massy (FR)

( * ) Notice: Subject to any disclaimer, the term of this patent is extended or adjusted under 35 U.S.C. 154(b) by 69 days.

(21) Appl. No.: 11/022,597

(22) Filed: Dec. 22, 2004

(65) Prior Publication Data

US 2006/0136162 A1    Jun. 22, 2006

(51) Int. Cl.
*G01V 1/00* (2006.01)

(52) U.S. Cl. ......................................... 702/14; 367/73
(58) Field of Classification Search ................ 702/14, 702/11, 12, 13; 367/18, 73; 703/9, 10; 175/50
See application file for complete search history.

(56) References Cited

U.S. PATENT DOCUMENTS 4,679,174 A    7/1987   Gelfand (Continued)

FOREIGN PATENT DOCUMENTS

EP    0 297 737 A3    1/1989

(Continued)

OTHER PUBLICATIONS

Torres-Verdin et al., Integrated Approach for the Petrophysical Interpretation of Post- and Pre-Stack 3-D Seismic Data, Well-Log Data, Core Data, Geological Information and Reservoir Production Data Via bayesian Stochastic Inversion, Mar. 2004, The University of Texas Center for Petroleum and Geosystems Engineering & Institute for Geophysics.*

(Continued)

*Primary Examiner*—John E. Barlow
*Assistant Examiner*—Toan M. Le
(74) *Attorney, Agent, or Firm*—Jack E. Ebel (57) ABSTRACT

A method is provided for predicting a value of a designated rock or fluid property in a subterranean geologic volume. A first predicted value of the designated rock or fluid property is also assigned to a volume of a multi-dimensional, multi-scale model. A first predicted value of seismic response for the model volume is calculated from a response model using the first predicted value of the designated rock or fluid property, wherein the response model is responsive to changes in predicted values of the designated rock or fluid property. A synthetic trace is generated and iteratively compared to the corresponding trace obtained from one or more sets of actual seismic data to determine a difference while consistency is maintained between the types, scales and dimensions of values and data. The first predicted value of the designated rock or fluid property is adjusted in response to the difference to create a second predicted value of the designated rock or fluid property, wherein the second predicted value generally reduces the difference.

21 Claims, 8 Drawing Sheets

U.S. PATENT DOCUMENTS

| | | | |
|---|---|---|---|
| 5,487,001 A | 1/1996 | Neff | |
| 5,583,825 A | 12/1996 | Carrazzone et al. | |
| 5,638,269 A | 6/1997 | Fournier et al. | |
| 5,691,958 A * | 11/1997 | Calvert et al. | 367/73 |
| 5,798,982 A | 8/1998 | He et al. | |
| 5,838,634 A * | 11/1998 | Jones et al. | 367/73 |
| 5,905,657 A * | 5/1999 | Celniker | 703/5 |
| 6,128,577 A * | 10/2000 | Assa et al. | 702/2 |
| 6,246,963 B1 * | 6/2001 | Cross et al. | 702/14 |
| 6,302,221 B1 * | 10/2001 | Hamman et al. | 175/50 |
| 6,374,185 B1 * | 4/2002 | Taner et al. | 702/6 |
| 6,381,543 B1 * | 4/2002 | Guerillot et al. | 702/13 |
| 6,401,042 B1 * | 6/2002 | Van Riel et al. | 702/17 |
| 6,480,790 B1 * | 11/2002 | Calvert et al. | 702/14 |
| 6,618,678 B1 | 9/2003 | Van Riel | |
| 6,654,692 B1 * | 11/2003 | Neff | 702/11 |
| 6,665,615 B2 | 12/2003 | Van Riel et al. | |
| 6,876,928 B2 | 4/2005 | Van Riel et al. | |
| 6,970,397 B2 * | 11/2005 | Castagna et al. | 367/73 |

FOREIGN PATENT DOCUMENTS

| | | |
|---|---|---|
| EP | 0 366 224 A3 | 5/1990 |
| EP | 0 745 870 A2 | 12/1996 |
| EP | 0 864 882 B1 | 7/2003 |

OTHER PUBLICATIONS

Klimentos, T., Petrophysics and Seismic Wave Technology: Applications in Exploration, Formation Evaluation, and Reservoir Characterization, 1995, SPE 29887, pp. 503-518.*

Besheli et al., Reservoir Characterization by Seismic Attributes With Vp & Vs Measurement of Core Samples (a "Rock Physics" study), Jan. 21, 1998, Geophysics Department, RIPI-NIOC.*

Bachrach, et al., Combining Rock Physics Analysis, Full Waveform Prestack Inversion and High-Resolution Seismic Interpretation to Map Lithology Units in Deep Water: A Gulf of Mexico Case Study, Apr. 2004, The Leading Edge, pp. 378-383.*

TDROV Promotional Flyer, Pioneering Geoscience, 1998. S. Pharez et al., "Layered Acoustic Impedance applied to the Ewan Field, Offshore Nigeria", SEG Expanded Abstracts, 1998.

S. Gluck et al., "High-Resolution Impedance Layering Through 3-D Stratigraphic Inversion of Poststack Seismic Data", The Leading Edge, Sep. 1997, pp. 1309-1315.

Mavko, G. et al., editors; Rock Physics Formulas, Rock Physics Laboratory, "Gassmann's Relations", Standford University, 1993, p. 61.

Cao, D. et al., "A Simultaneous Inversion for Background Velocity and Impedance maps", Geophysics, vol. 55, No. 4 (Apr. 1990); pp. 458-469.

Richard, V. et al., "Linearized Elastic Inversion of Synthetic Data From a Gas-Bearing Sand Model", EAEG-55th Meeting and Technical Exhibition, Stavanger, NO, Jun. 1993, 2 pp.

"Fugro-Jason Claims New Step in Integration for Latest Workflow", First Break, vol. 22, EAGE, Apr. 2004, 1 page.

Gluck, S. et al., "Robust Multichannel Stratigraphic Inversion of Stacked Seismic Traces", Revue De L'Institut Francais Du Petrole, vol. 45, No. 3, 1990, pp. 383-398.

Mallick, S., "Some Practical Aspects of Prestack Waveform Inversion Using a Genetic Algorithm: An Example . . . ", Geophysics, vol. 64, No. 2 (Mar.-Apr. 1999), pp. 326-336.

Mallick, S., "Prestack Waveform Inversion of Multi-Component Seismic Data", 70th Annual SEG International Meeting, Calgary Canada, Aug. 2000, pp. 2273-2276.

Minkoff, S. et al., "Reservoir Characterization Via Time-Lapse Prestack Seismic Inversion", 68th Annual SEG International Meeting, New Orleans, Sep. 1998, pp. 44-47.

Bornard, R. et al., "Petrophysical Seismic Inversion to Determine More Accurate and Precise Reservoir Properties", SPE International, 94144, Spain, Jun. 2005, pp. 1-13.

Caldwell, D. H. et al., "101—A Method for Fine-Scale, Quantitative Description of Reservoir Properties from Seismic", EAGE 66th Conf., France, Jun. 2004, pp. 1-4.

Ma, X., "Simultaneous Inversion of Prestack Seismic Data for Rock Properties Using Simulated Annealing", Geophysics, vol. 67, No. 6 (Nov.-Dec. 2002); pp. 1877-1885.

Ma, X., "Global Joint Inversion for the Estimation of Acoustic and Shear Impedances from AVO Derived P- and S-Wave . . . ", First Break, vol. 19, Oct. 2001, pp. 557-566.

Pendrel, J., "Estimation and Interpretation of P and S Impedance Volumes From Simultaneous Inversion of P-Wave Offset", GeoCanada 2000 Millennium Geoscience Summit, pp. 1-4.

Pan, G. et al., "An Integrated Target-Oriented Prestack Eleastic Waveform Inversion: Sensitivity, Calibration, and Application", Geophysics, vol. 59, No. 9, 1994, 1392-1404.

Tonellot, T. et al., "Prestack Elastic Waveform Inversion Using a Priori Information", SEG 1999 Expanded Abstracts, 4 pgs.

Ma, X., "A Constrained Global Inversion Method Using an Overparameterized Scheme: Application to Poststack Seismic Data", Geophysics, vol. 66, No. 2, 2001, pp. 613-626.

Tarantola, A., "A Strategy for Nonlinear Elastic Inversion of Seismic Reflection Data", Geophysics, vol. 51, No. 10, 1986, pp. 1893-1903.

Connolly, P., "Elastic Impedance", The Leading Edge, Apr. 1999, pp. 438-452.

Tsemahman, A. S. et al., "Stimultaneous Inversion of VSP Data using the . . . ", 66th Annu. SEG Int. Mtg. (Denver, Nov. 10-15, 1996) expanded Abstr. Biogr V2, pp. 1939-1942, 1996.

* cited by examiner

METHOD FOR PREDICTING QUANTITATIVE VALUES OF A ROCK OR FLUID PROPERTY IN A RESERVOIR USING SEISMIC DATA

TECHNICAL FIELD

The present invention relates generally to a method for predicting quantitative values of a designated rock or fluid property which are error minimized using geologic and petrophysical models and seismic data, and more particularly, to a method for predicting quantitative values of a designated rock or fluid property using a stratigraphic framework in which different data types having differing scales and/or resolutions are managed to ensure internal consistency thereof. The resulting multi-dimensional, multi-scale model facilitates recovery of a subterranean resource, such as oil, gas, water and/or mineral(s), or recovery and/or containment of pollution.

BACKGROUND OF THE INVENTION

In the exploration for and/or the exploitation of a resource, such as hydrocarbons, from subterranean environs, there is an ongoing need to accurately characterize subterranean reservoirs of interest. Knowing the areal extent, hydrocarbon content, and fluid permeability of a hydrocarbon-bearing, subterranean reservoir is extremely important to reduce the risk of exploration and/or exploitation and conversely to increase the efficiency and/or rate of return on hydrocarbon production from the reservoir. Such information regarding the subterranean reservoir is most readily obtained from one or more wells, which are drilled through the reservoir. Drilling rates, drill cuttings, changes in drilling mud composition, and core samples from a well provide the requisite information. Logs generated by passing well logging tools through a well are also a good source of information. Logs provide valuable information concerning the rock and fluid properties of the subterranean reservoir, such as porosity, fluid identification, and shale volume. Exemplary logs include resistivity, gamma ray, density, compressional velocity, shear velocity, and neutron logs.

Since most logs only measure rock and fluid properties only a few feet from the well bore and the vast majority of the reservoir is not penetrated by wells, the logs are unfortunately only capable of characterizing an extremely small fraction of a reservoir. Furthermore, the act of drilling stresses the rock surrounding the well bore, thereby changing the rock properties and introducing error into measurements obtained by well logging and core analysis. Additional information, such as fluid pressure and reservoir effective permeability-thickness, is obtained from flow tests performed after a well is drilled. However, such tests yield information on a small percentage of the total productive reservoir. Thus, a long-standing need exists to accurately characterize rock and fluid properties across substantially the entirety of a subterranean reservoir and, in particular, to accurately characterize rock and fluid properties in regions of the reservoir which are not sampled by wells.

Well data has conventionally been extrapolated away from the well bore to characterize the entirety of the reservoir when well data is limited. Conventional extrapolation techniques depict the subterranean reservoir as a plurality of three-dimensional arrays of blocks or cells that are integrated together to form a three-dimensional model of the reservoir. Typically, the X, Y and Z coordinates of each block are determined in both absolute elevation and stratigraphic surfaces and search algorithms are used to determine relative data points in the vicinity of each block. In addition, the rock properties of each block are assigned by means of estimation methods, such as distance-based methods using interpolated averaging methods which are based upon nearby data values and geostatistical methods which account for both the distance and spatial continuity of rock properties.

Seismic surveys have also been used to provide seismic information over the portions of the subterranean reservoir that are not sampled by a well. Seismic surveys can sample substantially the entire subterranean reservoir of interest, and therefore, represent an extremely valuable measurement of inter well and/or undrilled reservoir properties. Impact devices, such as vibratory sources, gas guns, air guns, explosives and weight drops, are employed at the earthen surface or in a well bore as a seismic source to generate shear and compressional waves in the subterranean strata. These waves are transmitted through the subterranean strata, reflected at changes in acoustic impedance, and recorded, usually at the earthen surface, by recording devices placed in an array. The seismic data is usually recorded in a plurality of amplitude volumes, for example angle of incidence, time of acquisition, shooting direction, and primary or mode-converted shear reflections. This recorded data is typically processed using software that is designed to minimize noise and preserve reflection amplitude. The seismic surveys are ultimately evolved into three-dimensional data sets representing a direct measurement of the surfaces of the rock that define the subterranean reservoir. The data sets are increasingly used to evaluate and map subsurface structures for the purpose of exploring or exploiting oil, gas or mineral reserves. However, seismic data has traditionally been utilized mainly in three-dimensional geologic models for the purpose of defining the top and base of the model.

Recorded seismic data has also been processed by software to convert the data to a value of acoustic impedance. Acoustic impedance, which is a measure of the opposition of the flow of sound through a surface, is an inherent rock property. A number of seismic inversion software packages are commercially available which process the seismic data, converting the data to a distribution of seismically-derived acoustic impedance over time or depth within the geologic volume. An exemplary seismic inversion software package is available under the trade name "TDROV" from CGG Americas Inc., 16430 Park Ten Place, Houston, Tex. 77084, USA. Such inversion software uses an error minimization algorithm to determine the best fit for the acoustic impedance derived from the recorded seismic value. The values of acoustic impedance thus derived have been used to interpret subterranean zones of interest, for example by estimating the location of subterranean boundaries and the thickness of a layer, zone, formation, reservoir, etc. However, as acoustic impedance calculated by such inversion software is not constrained by the petrophysical properties of the subterranean zones of interest, the values of acoustic impedance derived from such inversion software often do not accurately reflect the actual rock and fluid properties of the subterranean zones of interest, but rather only relative values. Accordingly, interpretations of subterranean zones of interest based upon values of acoustic impedance derived by application of such inversion software are often inaccurate and therefore problematic.

One approach to obtain values of acoustic impedance from inversion software that are within an acceptable solution range, involves further constraining the results of acoustic impedance with petrophysical properties of the subterranean zone(s) of interest. In accordance with this approach, acoustic impedance is first obtained by processing recorded seismic data with inversion software as discussed above. The value of acoustic impedance derived from this software is then further inverted by means of suitable algorithms to obtain rock properties, such as porosity. As with the acoustic impedance inversion software, this rock property software includes error minimization algorithms to determine the best fit for the rock property value derived from the acoustic impedance. However, by first determining acoustic impedance from recorded seismic values, prior to sequentially determining rock properties from acoustic impedance, errors associated with the acoustic impedance determination are compounded by subsequent errors associated with the determining of rock properties from acoustic impedance. Further, seismic data for a given trace is recorded in a plurality of amplitude volumes, for example angle of incidence, time or acquisition, shooting direction, and primary reflection versus shear volume. Using the approach outlined above, each volume of seismic data recorded must be sequentially processed using seismic inversion and rock property inversion software resulting in solution ranges for rock properties for different volumes of a given seismic trace which do not overlap and therefore give rise to uncertainty of the accuracy of the results. In order to overcome the error propagation from this sequential method, all the available information and experimental data must be analyzed jointly. However, joint inversion schemes that solve only for elastic properties, such as compressional and shear velocities and densities, do not directly provide information required for important reservoir properties and would require an additional sequential step similar to that described above. Other schemes of joint inversion that solve directly for rock properties often omit constraints necessary for uncertainty reduction, such as scale constraints. For example, the thinnest layers corresponding to seismic resolution frequently do not describe properties of a scale important for reservoir performance prediction, but are limited to averages of flow-unit scale layers. Another omitted constraint is the relationship between velocity, time and thickness. Joint inversion schemes that operate in a single vertical axis scale, typically compressional wave 2-way travel time, do not optimally reconcile the location, thickness, velocity relationships of layers at flow unit scale.

For precise reservoir description, joint inversion schemes must be able to maintain consistency of properties from the thinnest flow unit to the seismic resolution to the geologic sequence, in other words, over all scales and measurement domains. The interfaces and values for the layers must be variable within physically realistic constraints to minimize the difference between the reservoir model and the seismic observations at the resolution required for reservoir response description while maintaining consistency with the geological, petrophysical constraints. Thus, the present invention recognizes a need to more effectively integrate seismic data with geologic and petrophysical models for accurate characterization of subterranean reservoirs.

SUMMARY OF THE INVENTION

To achieve the foregoing and other objects, and in accordance with the purposes of the present invention, as embodied and broadly described herein, one characterization of the present invention is a method for determining a value of a designated rock or fluid property in a subterranean geologic volume. The method comprises assigning a first predicted value of a rock or fluid property to a cell within a multi-dimensional layered model that is correlated to a subterranean geologic volume. A first predicted value of a seismic response for the cell is calculated from a response model using the first predicted value of said rock or fluid property, wherein the response model is responsive to changes in predicted values of the rock or fluid property. At least one synthetic trace that is generated from the first predicted value of seismic response is compared to the corresponding trace obtained from one or more sets of actual seismic data corresponding to the subterranean geologic volume to ascertain a difference between the synthetic trace and the corresponding trace. The step of comparing involves maintaining consistency between the types, scales and dimensions of the first predicted value of a designated rock or fluid property and the actual seismic data. The first predicted value of the designated rock or fluid property is adjusted in response to the difference to create a second predicted value of the designated rock or fluid property, wherein the second predicted value generally reduces the difference.

In another characterization of the present invention, a method is provided for iteratively determining an error-minimized value of a designated rock or fluid property at a location in a subterranean geologic volume. The method comprises characterizing the geologic volume by a multi-dimensional layered model volume having a plurality of model subvolumes, assigning a first predicted value of a designated rock or fluid property to each of the plurality of model subvolumes, and calculating a first predicted value of a seismic response for the interface between the at least two groups. At least one synthetic trace that is generated from the first predicted value of seismic response is compared to the corresponding trace obtained from one or more sets of actual seismic data corresponding to the subterranean geologic volume to determine a first difference between the synthetic trace and the corresponding trace. The step of comparing involves maintaining consistency between the types, scales and dimensions of the first predicted value of a designated rock or fluid property and the actual seismic data. The first predicted value of the designated rock or fluid property is adjusted in response to the difference to create a second predicted value of the designated rock or fluid property, wherein the second predicted value generally reduces the first difference.

In yet another characterization of the present invention, a method is provided for integrating different data types, scales and/or dimensions into multi-dimensional model. The method comprises: providing a multi-dimensional layered model having X, Y and multiple Z axes to store and manipulate data obtained from different domains: assigning first data on one of the Z axis based in a given domain to a volume within the multi-dimensional layered model; assigning second data on another of the Z axis based in one or more other domains to the volume within the multi-dimensional layered model; changing a variable in one of the first data or the second data; and updating the other of the first data or the second data in response to a rule of change so as to provided consistency between the first data and the second data.

In a still further characterization of the present invention, a method is provided for integrating different resolutions of data into multi-dimensional model layered model. The method comprises: providing a multi-dimensional layered model having at least one axis for storing and manipulating data; assigning first data on the at least one axis based in a first scale to a volume within the multi-dimensional layered model; assigning second data on the at least one axis based in a second scale to the volume within the multi-dimensional layered model; and converting one of the first data and the second data to same scale as the other of the first data and the second data.

DESCRIPTION OF PREFERRED EMBODIMENTS

In accordance with the simultaneous inversion process of the present invention, one or more volumes of seismic data, a petrophysical model, a rock physics model and a multi-dimensional, multi-scale model are utilized in a simultaneous inversion process in which quantitative values of rock or fluid properties that are initially populated into the multi-dimensional, multi-scale model from the petrophysical and/or rock physics models are simultaneously forward modeled to values of seismic response. A synthetic trace is then generated and iteratively compared to the corresponding trace obtained from one or more volumes of actual seismic data, and the selected rock and/or fluid properties are adjusted in response to such comparison to determine a best fit of the forward modeled seismic responses with one or more volumes of seismic data using error minimization algorithms as described below. As utilized throughout this description, the term "synthetic trace" means a trace that is the result of seismic modeling. An example of seismic modeling is one dimensional convolution, such as a trace which results from a wavelet, the form of which is mathematically extracted from actual seismic data either statistically, through well information, measurement, and/or observation, being convolved or mathematically applied to the forward modeled seismic responses. A more general approach involves solving for the full three-dimensional elastic wave equation. As previously mentioned, the seismic data is usually recorded in a plurality of response volumes, corresponding for example to different values of angle of incidence, time of acquisition, shooting direction, or mode of propagation such as compressional or shear, all or any portion of which can be introduced into the simultaneous inversion process of the present invention, as discussed below. Accordingly, the process of the present invention will result in the best fit or solution that is consistent with all of the available information for a given interpretation of each input component. The uncertainties in the input measurements and interpretations in each case will be quantified and the resulting multi-dimensional, multi-scale model will contain a measure of the expected precision of the results thereby facilitating the probability distribution of production forecasts and enhancing future exploration and/or exploitation of the subterranean zone, strata, reservoir and/or formation of interest.

Integration of all data types, scales and dimensions will be facilitated by using a multi-dimensional, multi-scale model. As utilized throughout this description, the term "multi-dimensional, multi-scale model" refers to a layered, geocellular, stratigraphic framework or model which may be run on a common platform, for example gOcad™ geomodeling solution software available from Earth Decision Sciences, Houston, Tex., Stratamodel™ geocellular modeling software available from Landmark Graphics, Houston, Tex., and RMS™ software available from Roxar Americas, Houston, Tex. Use of a single platform reduces the risk of error and simplifies use by individual(s).

Figure 1:
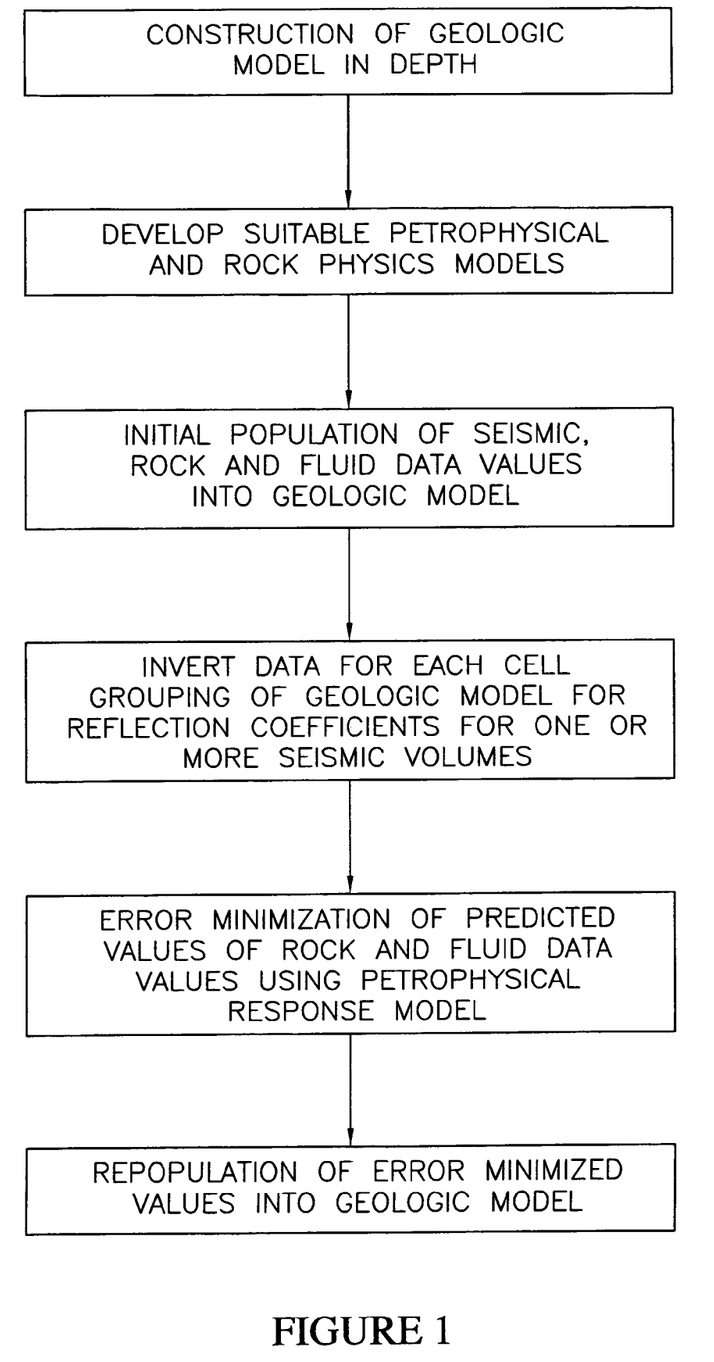
FIG. 1 is a schematic flowchart providing an overview of the method of the present invention.

An overview of the method of the present invention is illustrated in the flow chart of FIG. 1 and described below with reference to FIG. 1. The method comprises several stages. The first stage is construction of a multi-dimensional, multi-scale model based on an actual physical geologic volume which includes one or more fluid zones, strata, formations and/or reservoirs of interest. The multi-dimensional, multi-scale model comprises a model volume divided into an array of model subvolumes, cells or objects, such as cubes. The array of model subvolumes provides a dimensional framework for assigning and correlating experimental or predicted values of geophysical, geological and petrophysical properties to specified locations within the geologic volume, as hereinafter described. The multi-dimensional, multi-scale model is constructed using a distribution of experimentally determined seismic values for the geologic volume and other known experimental or derived data relating to the geologic volume that are obtained preliminary to the present method.

Figure 4:
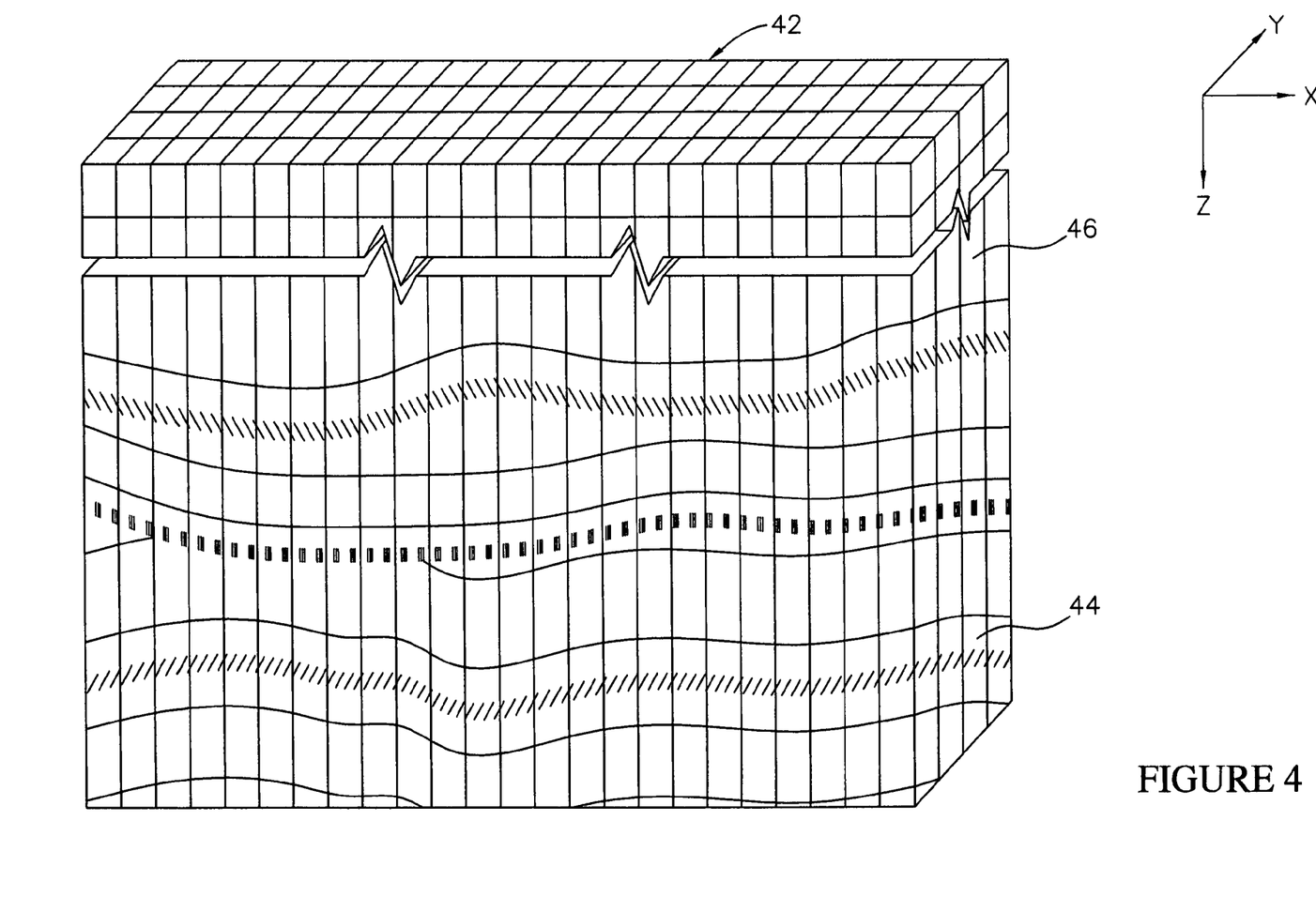
FIG. 4 is a schematic representation of a multi-dimensional, multi-scale model constructed in accordance with the embodiment of FIG. 3A, 3B.

The multi-dimensional, multi-scale model employed in the first step of the present invention is in the form of a multitude of three-dimensional, six-sided, subvolumes, cells or objects, such as cubes. Seismic data, such as reflection coefficients, seismic amplitude, etc., is conventionally organized in traces and represents subsurface interface attributes. Seismic data is sampled regularly along a trace and is accordingly regularly organized on a horizontal, orthogonal grid, commonly known as a bin. Accordingly, the stratigraphic framework or model of the present invention is horizontally organized in a grid having regularly spaced X and Y axes (FIG. 4). In the process of the present invention, interval or layer attributes of the subsurface volume, such as effective compressional velocity ($V_p$), effective shear velocity ($V_s$), and effective density ($\rho$), are also being processed. As such interval or layer attributes are irregularly sampled, e.g. due to variable thickness, the stratigraphic framework or model of the present invention is further vertically organized along a third, irregularly spaced Z axis (FIG. 4). In a conventional stratigraphic framework or model, each of the eight nodes of a subvolume, cell or object, e.g. cube, needs to be stored in memory to define a particular subvolume, cell or object of interest. However, by utilizing a grid having regularly spaced X and Y horizontal axes, a particular subvolume, cell or object of the stratigraphic model can be stored in memory by specifying a single X,Y coordinate for each stack of subvolumes, cells or objects which are vertically aligned, with only the Z coordinate to be further specified to differentiate each subvolume within a stack. In this manner, less computer memory is utilized to store information regarding location of a particular subvolume, cell or object within the stratigraphic model, and such information can be indexed for easy reference. This concept can be extended to irregular horizontal subvolumes, cells or objects which may be utilized, for example, to relate a flow simulator grid to a seismic grid for purposes of consistency in a shared earth model.

Within a multi-dimensional, multi-scale model as discussed above, various layered geometries (stratigraphic grids) exist having varying scales. For example, within the vertical framework of the model, layers (V1) defined by macro-horizons, such as those based upon interpreted seismic events from actual seismic data that are calibrated to well markers or data, when available, and that are depth converted [e.g., step 46], have relatively coarse scales, for example approximately 50 meters. Layers defined by micro-horizons (V2), such as those based upon seismic inversion resolution, have intermediate resolutions, for example approximately 8 meters. While layers defined by the geologic model (V3) are based upon geologic layering, and have a relatively fine resolution close to that of the well log data sampling, for example approximately 0.5 meter. These three vertical scales share some interfaces within a model and provide a partition of the model of the subsurface at a finer scale or resolution than the previous one.

In the horizontal framework of a geologic model, large cells (H1) of variable size based upon major structural or seismic events have relatively coarse scale, for example approximately 200 meters, and are generally used for flow simulation. Cells based upon the inversion scale (H2), are laterally regular in size, incorporate a multiple of seismic processing bins or cells and have an intermediate scale, for example approximately 25 meters. Whereas cells based upon the scale of a seismic bin (H3) have a relatively fine resolution, for example approximately 12.5 meters. Finer scales are also envisaged for near wellbore characterization. The available information on all scales needs to be consistent. For example, the interval velocity at V1 scale must be consistent with the up-scaled compressional velocity (Vp) information at the V3 or V2 scale.

Figure 5:
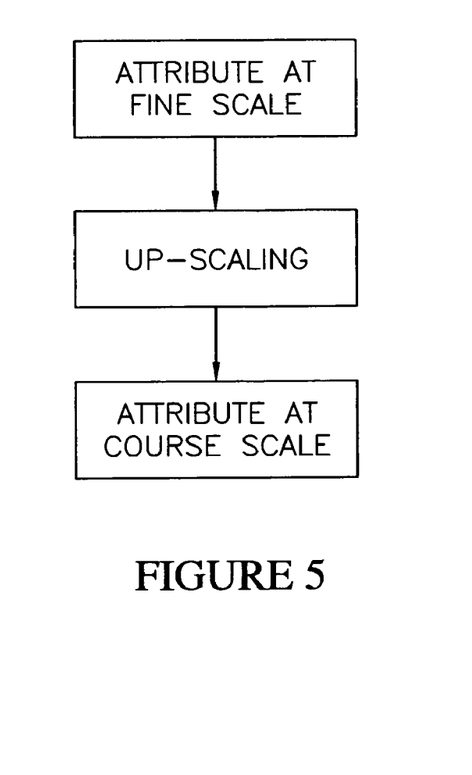
FIG. 5 is a schematic flowchart of the up-scaling of an attribute or property in a stratigraphic model in accordance with one aspect of the present invention.
Figure 6:
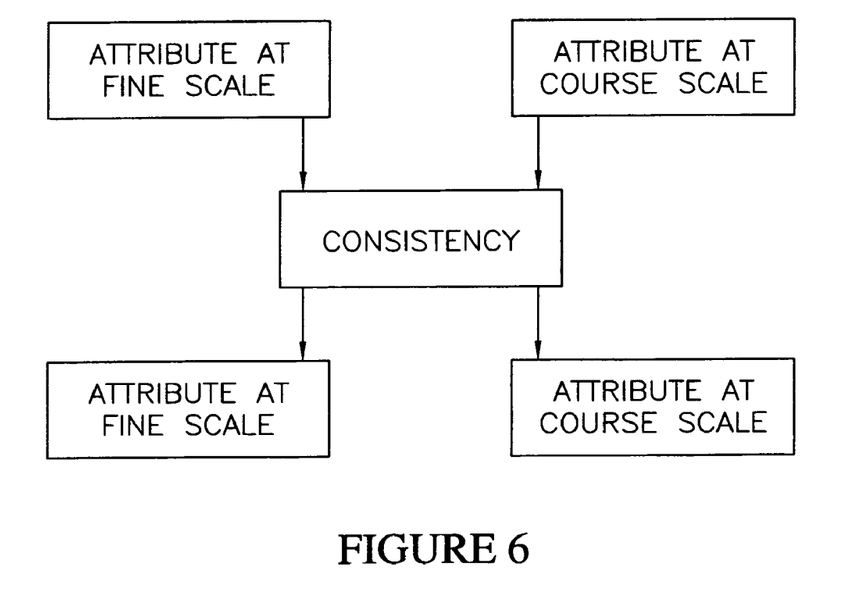
FIG. 6 is a schematic flowchart illustrating a method in accordance with the present invention of providing consistency of an attribute or property at two different scales within a stratigraphic model.
Figure 7:
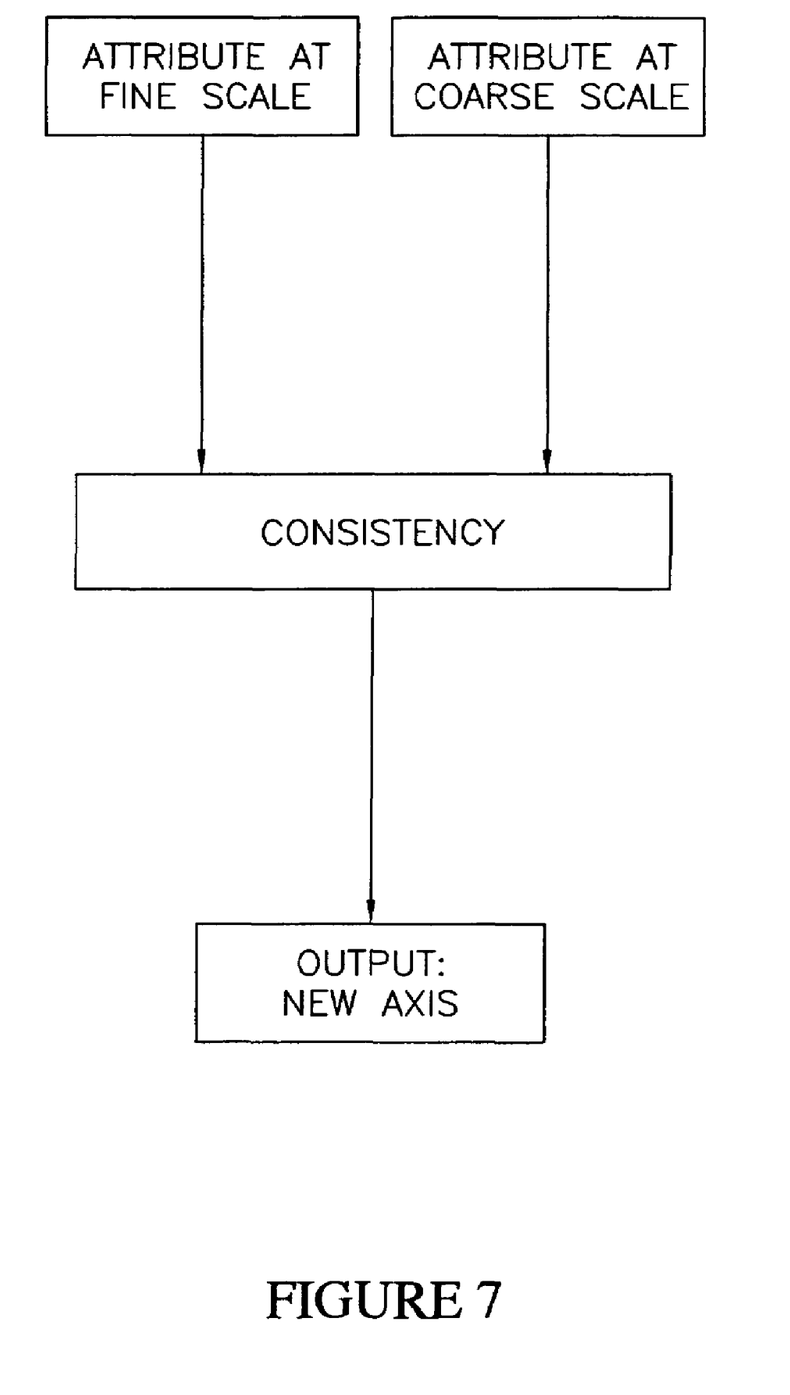
FIG. 7 is a schematic flowchart depicting an axis creation or update for a stratigraphic model.

These different scales or resolutions of data are stored in the stratigraphic grid in a nested manner, each small-scale cell belongs to a larger scale. Scale changes to create a property at a different scale than it was originally created are controlled in the stratigraphic framework of the present invention through an up-scaling/down-scaling procedure. The creation of a property at a large scale from a property at a small scale is illustrated in FIG. 5. For a given rock property, such as bulk density of a piece of earth within each cell of the stratigraphic framework, the property has a determined value from seismic data that is assigned to the appropriate cell of the stratigraphic framework. This property is up-scaled by a rule or equation and corresponding computation to a value at a larger scale. For density, the rule could be the average of the density values for all the small cells nested within a larger cell weighted by their respective volumes. The resultant value is attached to the larger scale. Different up-scaling/down-scaling methods may be employed as is best suited to the property being rescaled. With respect to up-scaling, averaging, such as arithmetic, geometric and harmonic, integration or any other suitable method as will be evident to a skilled artisan may be employed. For down-scaling, stochastic simulations or any other suitable method may be employed as will be evident to a skilled artisan. This model allows a skilled artisan to manipulate data at a scale (fine or coarse) and/or axis, i.e. time or distance) of interest for a particular application. For example, a reservoir engineer can view the model at a scale corresponding to a fluid flow simulator, i.e. distance axis and coarse scale (up scale) both vertically and horizontally. A seismic processor can likewise view the model in a time axis, at the seismic bin (H3), relatively fine resolution horizontally but coarser (V2) vertically than a geological model or a log sampling Once a given property or attribute exists at different scales, consistency between scales is maintained through a process that can be operated with or without seismic quantified uncertainties associated with the property. As illustrated in FIG. 6, the attribute or property at the fine scale and the attribute or property at the coarse scale is a given attribute or property, such as the compressional velocity. Values attached to the small cell size (V3, H3) are derived from the seismic inversion or derived from elastic wave propagation equations applied to a geologic model. Corresponding uncertainties are computed according to the origin of the data. Values attached to the coarse cell size (V1, H1) are from the depth conversion process of the main seismically interpreted events tied to well markers which also come with their respective uncertainties. These attributes are subjected to consistency steps in this process which apply rules enabling modification of one or more of the properties at small and large scale to maintain the consistency between the two. For example, velocity controls the relationship between time and depth and therefore multiaxis consistency. Accordingly, the consistency step may affect the geometry of one or more axes of the stratigraphic model of the present invention. This consistency step results in properties transformed to different scales with the rules within the range of their respective uncertainties.

In addition to different resolutions, data in a stratigraphic framework or geologic model can be represented in different domains or vertical axes, such as time or depth. The vertical axis for a conventional model incorporating geologic data is usually depth. For seismic applications, the vertical axis is usually travel time. The relationship between time and depth can be expressed as a velocity curve or a spatially variant velocity field. Accordingly, the stratigraphic framework of the present invention will incorporate and store data in two vertical axes that are coupled or uncoupled by one or more attributes. For example, where one axis of a stratigraphic model is expressed as two-way travel time (for relevant seismic data), time data from this axis is entered into a computational engine in addition to the governing rule of change. In the example of converting time to depth, the rule of change is a velocity field as an attribute of the stratigraphic grid along with a reference surface where both time and depth are known. In the computational engine, time and velocity values are combined with any proper unit conversion coefficients, as applicable. The output from this computation is appropriated positioned and stored on a new depth axis. Any modification of one of the three variables of time, depth or velocity in the case of time and depth axis being incorporated into the stratigraphic model, will necessitate the update of one or both of the other variables to maintain the consistency of the relationship between all three. For example, a change of velocity will induce a change in depth to compensate for it. Other data can be maintained on multiple axes in the stratigraphic model used in the present invention. For example, repeated seismic measurements can each be stored separately on separate time axis and coupled and uncoupled to a common depth axis. Where subsidence of a subterranean zone or reservoir of interest occurs, there can even be as many depth axes as seismic measurements or time axis. For pre-stack seismic data, for a given depth axis, there are as many time axes as there are offset or angle considered. And for converted wave problems, there is one depth axis and two time axes corresponding to corresponding to the primary wave and the converted (shear) wave with corresponding velocities.

The second stage comprises the development and/or selection of suitable petrophysical and/or rock physics models and/or elastic wave propagation models for use in the method of the present invention. Examples of petrophysical models that are useful in the present invention are permeability and/or fluid saturation models. Any suitable rock physics model that relates petrophysical and production-related properties to elastic properties may be used in the process of the present invention. Examples of rock physics models that are useful in the present invention are models using the Gassmann equation. Examples of elastic wave propagation models that link elastic properties to the seismic response include the Zoeppritz equations and the well known Aki and Richards or Shuey approximations thereof.

The third stage of the present method is initial population of data values into the multi-dimensional, multi-scale model. In accordance with the initial data population stage, quantitative values of certain geophysical and petrophysical properties of the geologic volume are assigned to the entirety of the multi-dimensional, multi-scale model. Estimated values of rock and fluid properties of the geologic volume based upon input from the petrophysical and/or rock physics models and/or geologic interpretation is assigned to every subvolume of the multi-dimensional, multi-scale depth based model. The estimated values of the rock and fluid properties include initial estimated values of the designated rock or fluid property (alternately termed first predicted values) that are of particular utility to the present method. Examples of rock and fluid properties suitable for population are the mineral or the matrix (grain) modulus ($K_m$), the water modulus ($K_w$), the oil modulus ($K_o$), the gas modulus ($K_g$), the frame modulus or the dry rock modulus ($K_a$, $K_d$, $K_{dry}$), the frame shear modulus or the dry rock shear modulus ($G_a$, $G_d$, $\mu_d$, $G_{dry}$, $\mu_{dry}$), mineral density or matrix (grain) density ($\rho_m$), water density ($\rho_w$), oil density ($\rho_o$), gas density ($\rho_g$), porosity ($\phi$), water saturation ($S_w$; volume percent of the pore space), oil saturation ($S_o$; volume percent of the pore space), and gas saturation ($S_g$; volume percent of the pore space).

In the fourth stage of the method of the present invention, the rock and fluid properties assigned to each subvolume of the multi-dimensional, multi-scale model are forward modeled to a seismic response by a petrophysical response model that uses one or more equations selected or otherwise derived from physical relationships between rock, fluid and seismic properties in a reservoir, which are known to skilled artisans in rock and fluid physics. As this forward modeling is performed as a function of angle of incidence of the seismic data, multiple angles of incidence may be input into the petrophysical response model to calculate a seismic response for each angle of incidence.

The fifth stage of the method is the error minimization of the predicted values of the designation rock and/or fluid properties. The error minimized value of the rock and/or fluid property assigned to a particular geologic subvolume is determined by initially comparing one or more synthetic traces that are generated from the forward modeled seismic responses to the corresponding traces from the actual seismic data to determine the difference between the traces. From this initial comparison, the initial prediction of rock and/or fluid properties is iteratively adjusted for a given subvolume of the geologic model and a seismic response is calculated using the petrophysical response model and the adjusted predicted value(s) until the difference calculated between the synthetic traces and the corresponding traces from the actual seismic data is within an acceptable range of error or until other suitable criterion is met. The predicted value of the designated rock and/or fluid property which achieves this acceptable error or match is the error minimized value of the designated rock and/or fluid property for the selected model subvolume. A new model subvolume is then selected and the error minimization stage is repeated until an error minimized value of the designated rock and/or fluid property has been determined for every model subvolume in the model volume.

The final stage of the method is the repopulation of the error minimized values into the multi-dimensional, multi-scale model. In accordance with the error minimized values repopulation stage, the error minimized values of the designated rock or fluid property are substituted for every corresponding first predicted value of the designated rock or fluid property which was initially populated into the multi-dimensional, multi-scale model in the third stage. The final product of the present method is a multi-dimensional, multi-scale model which is populated in its entirety, or to the extent desired, with error minimized data values of the designated rock or fluid property and which is correlated to the volume of interest. From this model, the volume of the substance of interest, for example oil, gas, mineral, water, pollution, etc., can be predicted and the extraction or mitigation thereof facilitated.

Figure 2:
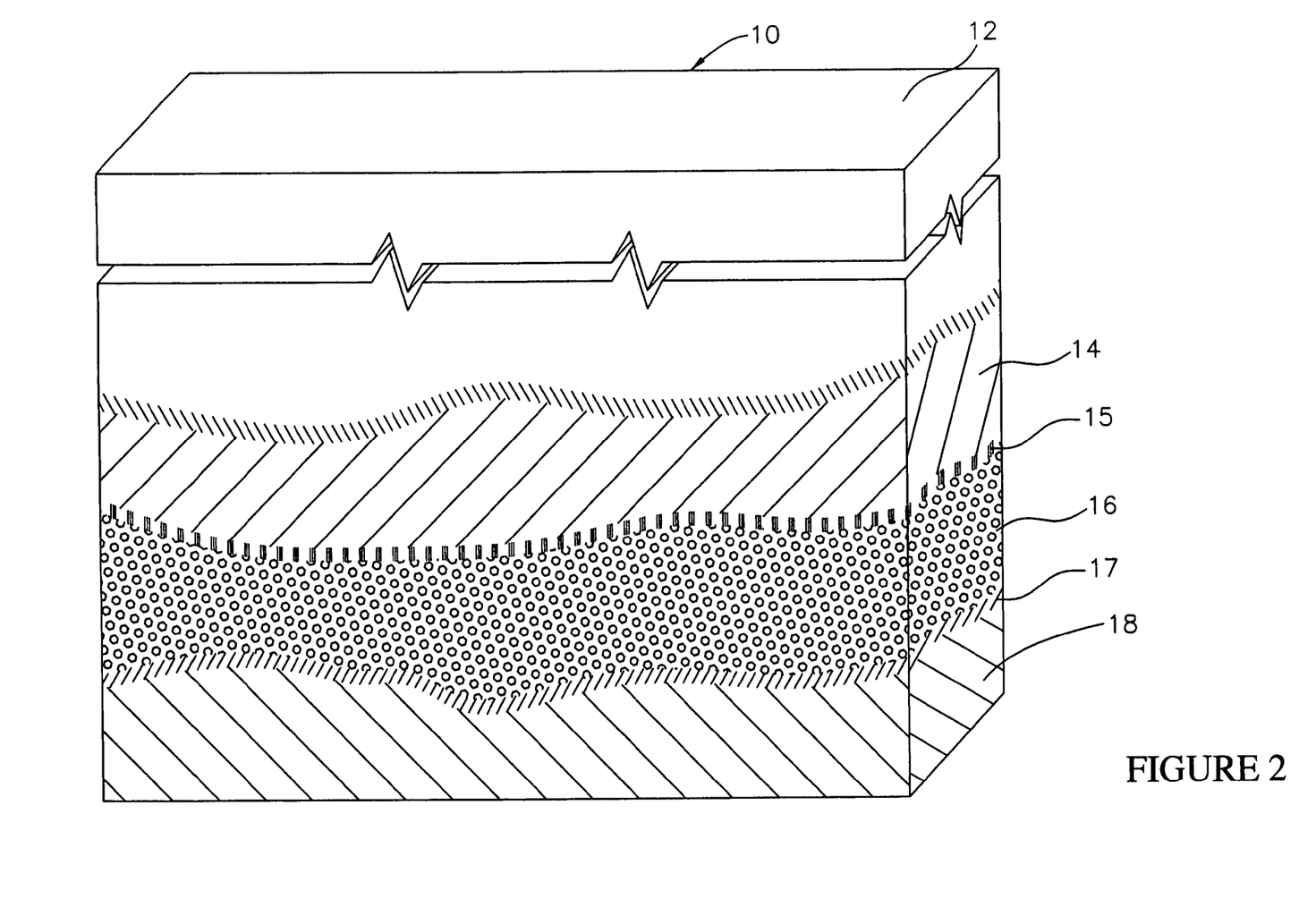
FIG. 2 is a schematic representation of a subterranean geologic volume including a fluid reservoir of interest.

A preferred embodiment of the method of the present invention is described below with reference to FIGS. 2-4. Referring initially to FIG. 2, a physical geologic volume is shown and generally designated 10. The method of the present embodiment is applicable to the geologic volume 10 which comprises an upper surface 12, which may extend to the earthen surface, and a plurality of subterranean strata 14, 16, 18 containing rock and fluid materials. As such, the geologic volume 10 includes a fluid reservoir, which is not specifically delineated in the Figures. The strata 14, 16, 18 extend beneath the designated upper surface 12 in layers which are serially stacked with depth. The strata 14, 16, 18 are distinguished from one another by different rock and fluid properties. Accordingly, the respective strata 14, 16, 18 are separated by stratigraphic events which define reservoir sequence boundaries 15, 17. It is understood, however, that FIG. 2 is merely a conceptualized representation of a subterranean geologic volume. Practice of the present method is not limited to any specific subterranean geologic volume, but is generally applicable to substantially any subterranean geologic volume from which seismic data can be experimentally generated.

Figure 3A:
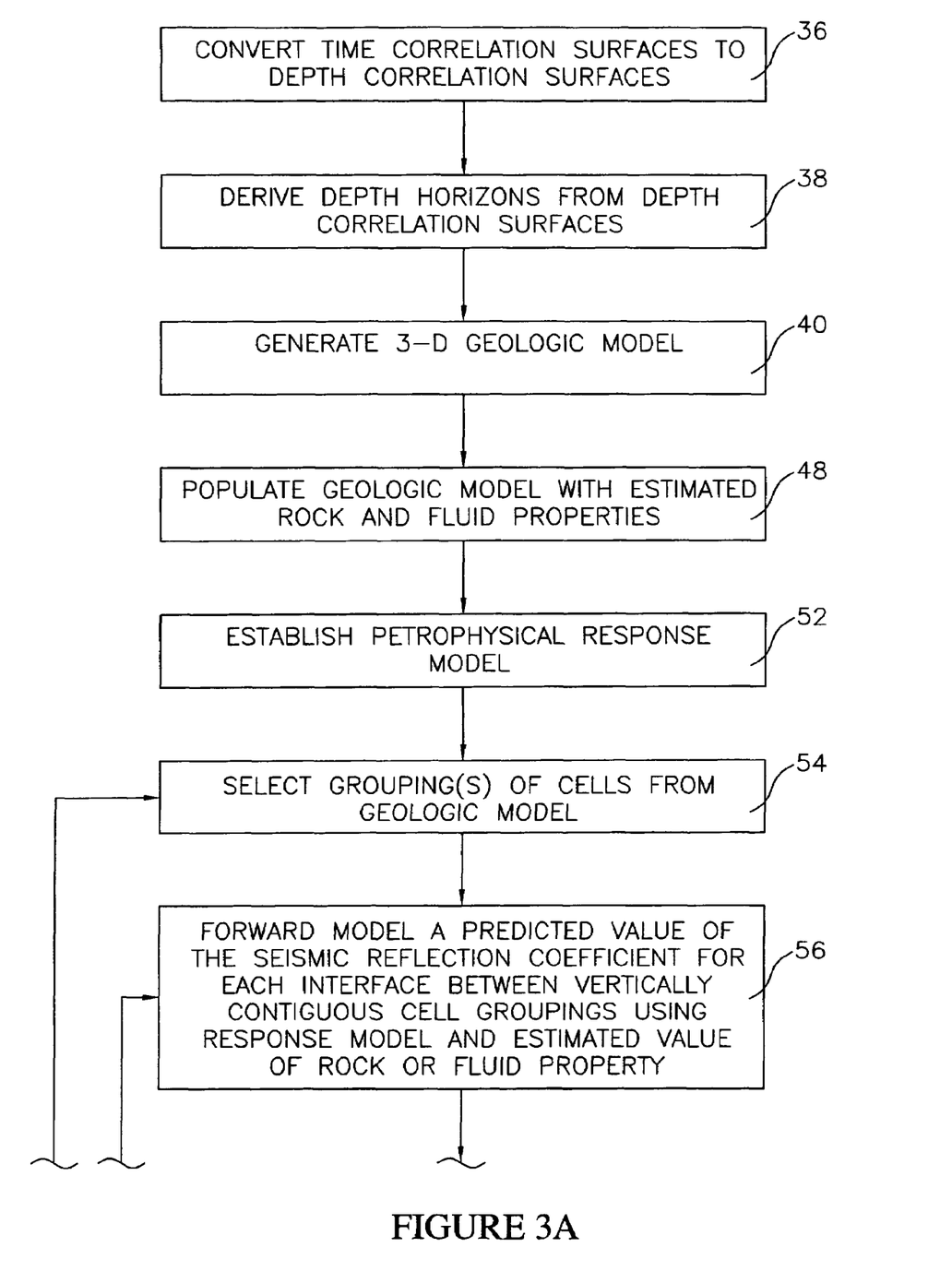
FIG. 3A, 3B is a schematic flowchart showing a detailed embodiment of the method of FIG. 1.
Figure 3B:
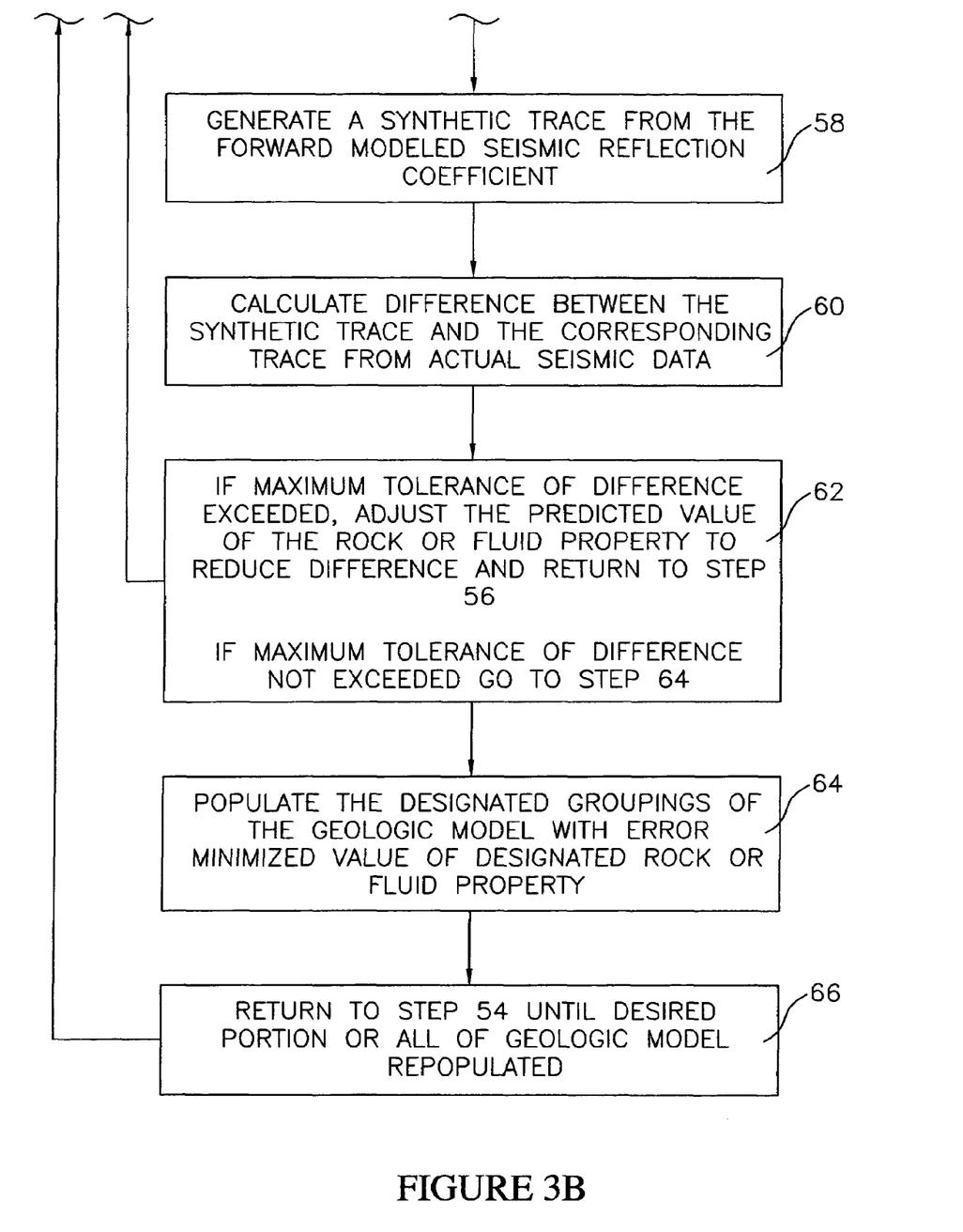

FIG. 3A and 3B set forth a detailed flow chart of the present embodiment which depicts the method in a stepwise manner. Preliminary to initiating the present method, seismic data is experimentally generated in the geologic volume 10 of interest by a seismic survey using conventional methods well known to the skilled artisan. Seismic data is generally defined for purposes of the present method as information generated by creating seismic waves within a geologic volume from artificial seismic energy sources and observing the arrival times and amplitudes of waves which are refracted through high velocity intervals within the geologic volume or waves which are reflected from interfaces within the geologic volume in response to the seismic waves. Such interfaces are typically the result of changes in acoustic velocity or bulk density. A number of data processing techniques are commonly applied to the seismic data to reduce noise or otherwise render the data more meaningful.

A limited amount of well data relating to rock or fluid properties in the geologic volume 10 may also be available to the practitioner before the process is initiated. Such data is typically acquired from exploration or production wells (not shown) penetrating the geologic volume 10. As noted above, well data is extremely limited in areal scope, having reliability at best from about one radial foot to about a few radial feet away from the well bore. In any case, well data, if available, can be used in the practice of the present method as described hereafter. It is understood, however, that the availability of well data is not a prerequisite to practice of the present method. It is only required that a distribution within the geologic volume 10 of values of petrophysical properties be estimated or that seismic data be preliminarily available from which it is possible to generate the distribution. If seismic data is not preliminarily available for the geologic volume 10, seismic data can alternatively be generated for the geologic volume 10 by conducting a seismic survey as an incidental step of the present method.

Referring to FIG. 3A and 3B, the present embodiment is initiated by step 36 wherein major gridded subsurface boundaries determined for time correlation surfaces are converted to a depth correlation surface using a best estimate of the average velocity to each horizon within the volume. Minor adjustments may be made to the depth correlation surfaces at well locations, if any, since the depth correlation surfaces do not usually identically match the horizon picks from the well locations. Minor adjustments may also be made to the depth correlation surfaces away from the well locations, if any, relying on the fact that fluid contacts are often identifiable as highly correlated spatial changes in the value of acoustic impedance. The estimated average velocities may also be readjusted in response to adjustments in the depth correlation surfaces. Step 38 derives depth horizons from the depth correlation surfaces, which are checked for negative isopach values. The depth horizons are combined to complete a depth layered framework. There is a one-to-one horizon correspondence between the depth layered framework and the time layered framework.

Step 40 generates a multi-dimensional, multi-scale model by dividing the depth layered framework into a plurality of three-dimensional model cells or blocks as previously discussed with respect to FIG. 4. As illustrated in FIG. 4, the multi-dimensional, multi-scale model of the geologic volume is shown and generally designated 42 and a representative cell is designated 44. multi-dimensional, multi-scale models of this type usually contain tens of millions of cells. The external boundary of the depth layered framework defines the model volume 46. The cells are ordered within the multi-dimensional, multi-scale model 42 so that no overlap occurs between the cells. Referring additionally to FIG. 4, the cell 44 is shown to have two dimensions expressed in units of length along axes x and y which typically delineate a rectangle or square in plan view. The cell 44 also has a third dimension expressed in units of length along the z axis which is representative of depth and delineates thickness. The specific dimensions of each cell are selected in response to the desired final volume scale which is input into the multi-dimensional, multi-scale model and well data, if available. For example, the cell dimensions can be selected as a function of line by cross-line spacing by well log sampling rate. Fine layering of the cells can be configured such that the cells are divided equally between two depth layered framework horizons (proportional), parallel to a top horizon (on-lap) or parallel to the bottom horizon (off-lap).

FIG. 4 is presented herein for purposes of illustration. The multi-dimensional, multi-scale model 42 and associated cells are but one possible configuration of the multi-dimensional, multi-scale model within the scope of the present invention. It is understood that the multi-dimensional, multi-scale model as taught herein is not constrained to any specific number of dimensions or units of expression. Nor are the cells constrained to any geometric configuration. It is, therefore, within the scope of the present invention to construct a multi-dimensional, multi-scale model of n-dimensions and having cells correspondingly dimensionally configured.

Referring again to FIG. 3A and 3B, the multi-dimensional, multi-scale model is populated with initial data values by step 48. The time layered framework and depth layered framework cooperatively provide a 3-D velocity field which enables mapping of depth to time and provides correspondence between the multi-dimensional, multi-scale model and positions within the time referenced seismic volumes. Each cell is populated with estimated rock and fluid properties based upon input from the petrophysical and/or rock physics models and/or geologic interpretation. The estimated values of the rock and fluid properties include initial estimated values of the designated rock or fluid property (alternately termed first predicted values) that are of particular utility to the present method. Examples of rock and fluid properties suitable for population are the mineral or the matrix (grain) modulus ($K_m$), the water modulus ($K_w$), the oil modulus ($K_o$), the gas modulus ($K_g$), the frame modulus or the dry rock modulus ($K_a$, $K_d$, $K_{dry}$), the frame shear modulus or the dry rock shear modulus ($G_a$, $G_d$, $\mu_d$, $G_{dry}$, $\mu_{dry}$), mineral density or matrix (grain) density ($\rho_m$), water density ($\rho_w$), oil density ($\rho_o$), gas density ($\rho_g$), porosity ($\phi$), water saturation ($S_w$; volume percent of the pore space), oil saturation ($S_o$; volume percent of the pore space), and gas saturation ($S_g$; volume percent of the pore space.

The rock and fluid properties are selected based on their utility in the petrophysical response model which is described below with reference to step 52. The values of the rock and fluid properties are estimated using known scientific and engineering principles and all available petrophysical data for the geologic volume. For example, well data may be available from well logs which provide certain localized well values of rock and fluid properties along the high resolution layers of the multi-dimensional, multi-scale model corresponding to well locations. Well data typically provides localized rock porosity values in addition to the identity of fluid types, such as gas, oil and water, and fluid saturation values. Other available data may include PVT calculations which provide estimates of fluid compressibility. Core samples provide grain densities and mineral composition of the rock. Distribution of the initial estimated values of the rock and fluid properties in the multi-dimensional, multi-scale model can be performed in accordance with any number of conventional techniques such as distance weighting, co-located co-kriging and the like. It may be necessary to retain the specific relationships between the initial estimated values of a given rock or fluid property provided by the distribution in subsequent adjustment steps of the present method. For example, the relative nature of strata porosity as a function of vertical location provided by the distribution must be retained in subsequent adjustment steps.

Step 52 establishes the petrophysical response model which is based on known relationships between rock and fluid properties and elastic properties such as compressional velocity, shear velocity and bulk density. The petrophysical response model is distinct from the multi-dimensional, multi-scale model, being a system of response equations, wherein the predicted designated rock or fluid property is a primary independent variable and the predicted elastic properties are primary dependent variables. The petrophysical response model is used to forward calculate predicted values of seismic response using the estimated values of the rock and fluid properties including the predicted values of the designated rock or fluid property. Thus, the petrophysical response model describes how one or more seismic responses vary with one or more rock and fluid properties including the designated fluid or rock property within the geologic volume.

The petrophysical response model is preferably derived from conventional predictive rock and fluid elastic moduli equations. An exemplary system of such equations is disclosed in Mavko, G., et al.; *The Rock Physics Handbook, Tools for Seismic Analysis in Porous Media,* Cambridge University Press, 1998, particularly pages 60-65, are incorporated herein by reference. Seismic reflection coefficient is related to elastic properties, i.e. compressional velocity, shear velocity and bulk density, as a function of the angle of incidence by the well known system of equations known as the Zoeppritz equations. Alternatively, any one of a number of linearization methods, such as the well known Aki and Richards approximation, can be employed in the process of the present invention in lieu of the Zoeppritz equations.

Compressional velocity is related to the rock and fluid properties by the First Christoffel equation:

$$v_p = [(K^* + 4/3 G^*)/\rho_b]^{1/2}$$

where: $K^*$=bulk modulus (inverse of system compressibility)
$G^*$=shear modulus
$\rho_b$=bulk density Shear velocity is related to the rock and fluid properties by the Second Christoffel equation:

$$V_s = [G/\rho_b]^{1/2}$$

where: $G$=effective shear modulus
$\rho_b$=bulk density

The bulk modulus can be calculated from the Gassmann expression:

$$K^* = K_A + [(1-(K_A/K_M)^2)/[(\Phi/K_F)+((1-\Phi)/K_M)-(K_A/(K_M)^2)]]$$

where: $K_A$=frame modulus (inverse of dry rock compressibility)
$K_M$=mineral modulus (inverse of grain compressibility)
$\Phi$=rock porosity
$K_F$=fluid modulus (inverse of fluid compressibility)

Shear modulus $G^*$ is often estimated as a function of rock porosity.

Bulk density is calculated as:

$$\rho_b = \rho_{ma}*(1-\phi)+\phi(S_w*\rho_w+(1-S_w)*\rho_{HC})$$

where: $\rho_{ma}$=matrix density
$\rho_w$=connate water density
$\rho_{HC}$=hydrocarbon density at the correct PVT conditions
$S_w$=reservoir water saturation As noted above with reference to estimating values of the rock and fluid properties, application of the model requires exhaustive use of all available petrophysical data for the geologic volume of interest. Well logs, if available, are examined to estimate variations, dependencies and limits on every parameter required by the petrophysical response model. PVT calculations or correlations, as required, are performed to estimate fluid compressibility. Fluid saturations are estimated by, for example, Leverett J functions. Core samples may be used in the determination of grain densities and mineral composition of the rock. Thus, the values of the designated rock or fluid property ultimately predicted by the present method are desirably constrained by physically acceptable values of the remaining rock and fluid properties used in the petrophysical response model.

Step 54 initiates a cell aggregate selection loop, wherein a grouping of contiguous cells is selected from the multi-dimensional, multi-scale model over which the seismic scale elastic properties are constant. The selected cell grouping described herein is a vertically stacked aggregate of contiguous cells. Upon selection of the cell grouping, an error minimization loop is initiated within the cell aggregate selection loop that comprises steps 56, 60, 62 and 64. In accordance with Step 56, a seismic response is forward modeled using the petrophysical response model for an interface between vertically contiguous cell groupings. In step 58, a synthetic trace is generated from the forward modeled seismic response. Step 60 calculates the difference between the synthetic trace that is generated from each forward modeled seismic response and the corresponding trace from the actual seismic data.

The difference between the synthetic trace(s) generated from the forward modeled seismic responses and the corresponding trace(s) of the actual seismic is part of the objective function desirably minimized by the algorithm of the error minimization loop. If the difference exceeds a maximum tolerance, for example, 1% or other criteria within the objective function are not met, step 62 adjusts the first predicted value of the rock or fluid property within acceptable limits to a second predicted value. As indicated by step 64, the first predicted value of the designated rock or fluid property is adjusted such that the second predicted value generally reduces the objective function. However, simulated annealing may be used as the convergence/minimization technique which occasionally will accept an increase in the objective function in the pursuit of the overall, ultimate optimum solution.

Step 64 returns the error minimization loop to step 56, wherein a second predicted value of seismic response is calculated using the petrophysical response model and the estimated values of the rock and fluid properties including the second predicted value of the designated rock or fluid property which replaces the first predicted value. Steps 58, 60, 62 and 64 are repeated as often as necessary until the objective function is less than or equal to the maximum tolerance. The predicted value of the designated rock or fluid property for each cell of the grouping that achieves this result is the error minimized value of the designated rock or fluid property for that cell.

Step 66 updates the multi-dimensional, multi-scale model by repopulating the cells of the selected grouping(s) of the multi-dimensional, multi-scale model with the error minimized values of the designated rock or fluid property. In particular, the newly-determined error minimized values of the designated rock or fluid property are substituted for each corresponding first predicted value of the designated rock or fluid property populated into the multi-dimensional, multi-scale model in step 48. Step 66 returns the cell aggregate selection loop to step 54, wherein another grouping(s) from the multi-dimensional, multi-scale model, is selected. The error minimization loop is performed for the newly-selected grouping(s) of contiguous cells to determine the error minimized values of the designated rock or fluid property for these cells. These error minimized values are then updated into the multi-dimensional, multi-scale model. The cell aggregate selection loop is repeated as often as necessary in the above-recited manner until an error minimized value of the designated rock or fluid property is determined for every cell in the multi-dimensional, multi-scale model.

The error minimized rock and fluid properties predicted by the process of the present invention can be graphically displayed or printed using commercially available software, for example gOcad™, Roxar™, and Stratamodel™ in any of a variety of formats, such as POSC® and Rescue™, as will be evident to a skilled artisan.

An additional feature of the present method is selection of the designated rock or fluid property. Selection of an appropriate designated rock or fluid property enables the practitioner to accurately characterize the fluid reservoir within the geologic volume when the multi-dimensional, multi-scale model is populated with the error minimized values of the property. The practitioner typically selects the designated rock or fluid property in association with or preliminary to the above-recited steps of FIG. 4. The selection criteria are within the purview of the skilled artisan and are a function of the specific needs of the practitioner. Typically the selection criteria are a function of the desired application of the resulting multi-dimensional, multi-scale model and error minimized data values. For example, one skilled in the art generally recognizes porosity, fluid type, or saturation as a meaningful rock or fluid property in hydrocarbon exploration applications. Similarly, one skilled in the art generally recognizes porosity, fluid type, or reservoir pressure as a meaningful rock or fluid property in reservoir management applications. Therefore, although the present method is not limited to any specific designated rock or fluid property, the above-recited rock and fluid properties, i.e., porosity, fluid type, saturation, and reservoir pressure, are exemplary of designated rock or fluid properties having utility in the present method.

EXAMPLE

Figures 8A, 8B:
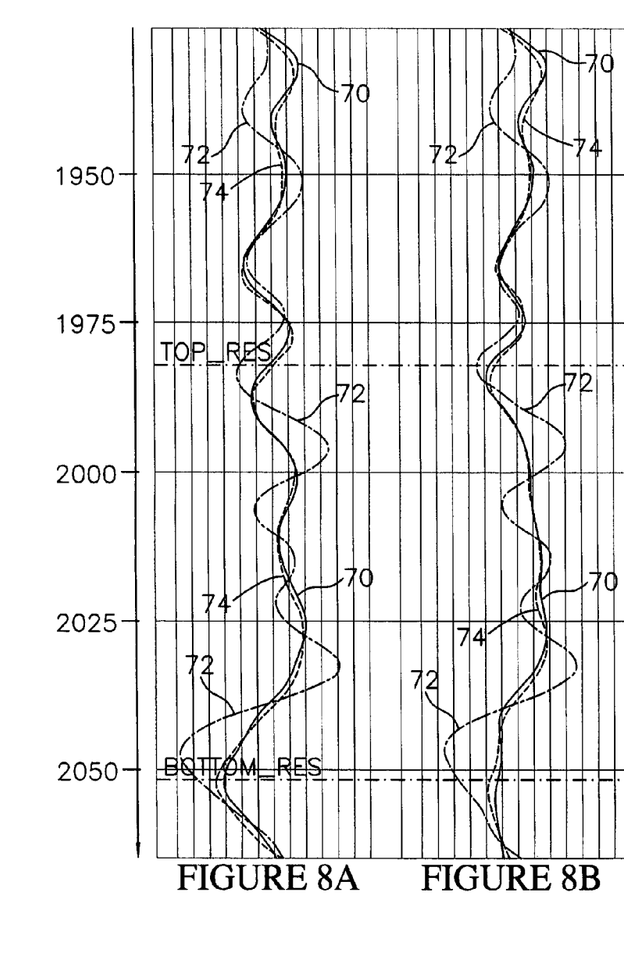
FIGS. 8A-8C are graphical representations of comparisons between synthetic and true seismic traces from near, mid and far partial seismic data stacks, respectively, before and after the application of the process of the present invention.
Figure 8C:
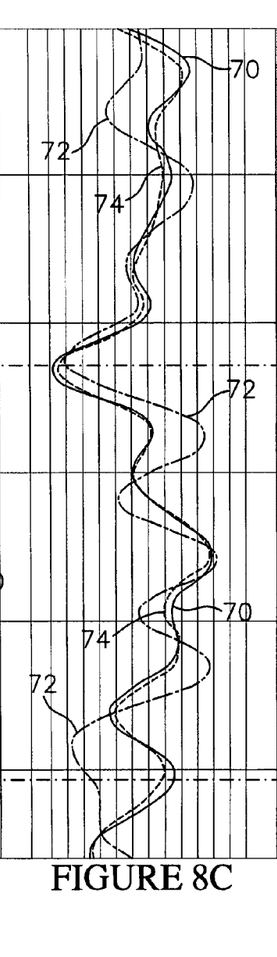
Figure 8D:
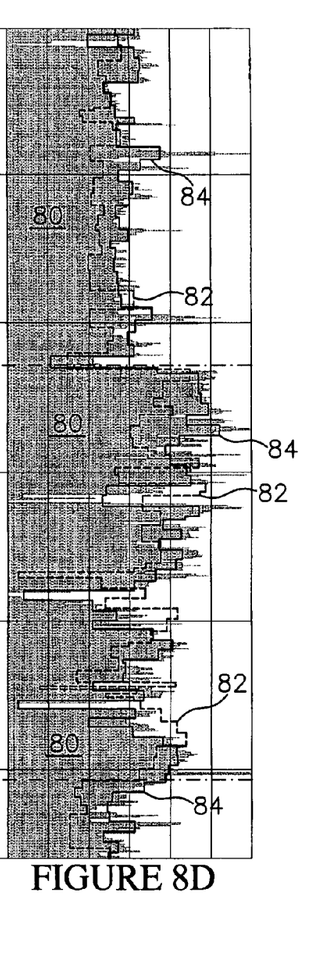
FIG. 8D, is a graphical representation of a comparison between the first predicted value of porosity and the error minimized porosity curve with the well porosity also being displayed.

True seismic traces from near, mid and far partial seismic data stacks are illustrated as 70 in FIGS. 8A, 8B and 8C. In accordance with the process of the present invention, before and after the application of the process of the present invention, a first predicted value of porosity 82 (FIG. 8D) is assigned to a volume of a multi-dimensional, multi-scale gOcad™ model. A first predicted value of seismic response for the model volume is calculated from the porosity value. A synthetic trace 72 is generated and iteratively compared to the corresponding actual trace 70 illustrated in FIGS. 8A, 8B and 8C to determine a difference while consistency is maintained between the types, scales and dimensions of values and data. The first predicted value of porosity 82 is adjusted in response to this difference and the process of calculating a seismic response, generating a trace and comparing the generated trace to the actual trace is iteratively repeated until a match within a predetermined acceptable limit is achieved or other applicable criteria are met. The resulting traces 74 for near, mid and far partial seismic data stacks that are generated by application of the process of the present invention is illustrated in FIGS. 8A, 8B and 8C, respectively. The ability of the error minimized rock and fluid properties of the present method to accurately predict values of a designated rock or fluid property is clearly illustrated by FIGS. 8D. The resulting error minimized porosity curve is illustrated in FIG. 8D as 84 while the well porosity is illustrated as 80 in gray shading.

Another aspect of the process of the present invention involves the use of the stratigraphic framework in different domains or vertical axes (for example time or depth) to manage different data types having different scales or resolutions, i.e. fine to coarse, and to provide a mechanism to ensure internal consistency of all managed data.

In view of the foregoing description, it can be readily appreciated that the present invention recognizes a need to more effectively integrate seismic data with geologic and petrophysical models for accurate characterization of subterranean reservoirs by simultaneously fitting the best solution for simultaneous inputs of seismic volumes and petrophysical and production related properties into a geologic model while providing for a mechanism for ensuring consistency of data within the model.

While the stratigraphic model of the present invention has been described with respect to a method for predicting rock and fluid properties of a subterranean zone of interest to enhance characterization of a subterranean zone of interest to reduce the risk or exploration and/or characterization of hydrocarbons therefrom, the stratigraphic model and method of use described herein can be readily applied to characterize any subterranean zone of interest for any purpose, such as a near surface subterranean volume for the purpose of understanding environmental contamination and/or remediation. Further, the stratigraphic model and method of the present invention can be applied to the spatial study of above ground objects, for example ocean studies.

While the foregoing preferred embodiments of the invention have been described and shown, it is understood that alternatives and modifications, such as those suggested and others, may be made thereto and fall within the scope of the present invention.

We claim:

1. A method for determining a value of a designated rock or fluid property in a subterranean geologic volume, the method comprising:

assigning a first predicted value of a rock or fluid property to a cell within a multi-dimensional layered model that is correlated to a subterranean geologic volume;

calculating first predicted values of seismic response for said cell from a response model using said first predicted value of said rock or fluid property and based upon compressional velocity, shear velocity and bulk density, wherein said response model is responsive to changes in predicted values of said rock or fluid property;

comparing synthetic traces that are generated from said first predicted values of seismic response to the corresponding traces obtained from sets of actual seismic data corresponding to the subterranean geologic volume to ascertain a difference between said synthetic traces and said corresponding traces, said step of comparing involving maintaining consistency between the types, scales and dimensions of said first predicted value of a designated rock or fluid property and said sets of actual seismic data;

adjusting said first predicted value of said designated rock or fluid property in response to said difference to create a second predicted value of said designated rock or fluid property, wherein said second predicted value generally reduces said difference; and storing said second predicted value for later use.

2. The method of claim 1 wherein said multi-dimensional layered model has X, Y and multiple Z axes to store and manipulate data obtained from different domains, the process further comprising:

assigning first data on one of the Z axis based in a given domain to a volume within the multi-dimensional layered model;

assigning second data on another of the Z axis based in one or more other domains to the volume within the multi-dimensional layered model;

changing a variable in one of the first data or the second data; and updating the other of the first data or the second data in response to a rule of change so as to provide consistency between the first data and the second data.

3. A method for determining an error-minimized value of a designated rock or fluid property at a location in a subterranean geologic volume which is characterized by a multi-dimensional layered model volume having a plurality of model subvolumes, said method comprising:

assigning a first predicted value of a designated rock or fluid property to each of said plurality of model subvolumes;

calculating first predicted values of a seismic response for the interface between at least two groups of subvolumes based upon compressional velocity, shear velocity and bulk density;

comparing synthetic traces that are generated from said first predicted values of seismic response to the corresponding traces obtained from a plurality of response volumes of actual seismic data corresponding to the subterranean geologic volume to determine a first difference between said synthetic traces and said corresponding traces, said step of comparing involves maintaining consistency between the types, scales and dimensions of said first predicted value of a designated rock or fluid property and said plurality of response volumes of actual seismic data;

adjusting said first predicted value of said designated rock or fluid property in response to said difference to create a second predicted value of said designated rock or fluid property, wherein said second predicted value generally reduces said first difference; and storing said second predicted value for later use.

4. The method of claim 3 further comprising calculating a second predicted values of seismic response for said interface between said at least two groups using said second predicted value of said designated rock or fluid property.

5. The method of claim 4 further comprising comparing synthetic traces that are generated from said second predicted values of seismic response to the corresponding traces obtained from said plurality or response volumes of actual seismic data corresponding to the subterranean geologic volume to determine a second difference, wherein said second difference is generally less than said first difference.

6. The method of claim 3 further comprising iteratively repeating said steps of adjusting said predicted value of said designated rock or fluid property, calculating said predicted values of said seismic response using said adjusted predicted value of said designated rock or fluid property, and comparing said synthetic traces that are generated from said calculated predicted values of seismic response to the corresponding traces obtained from said plurality of response volumes of actual seismic data corresponding the subterranean geologic volume to determine said difference between said synthetic traces and said corresponding traces.

7. The method of claim 6 wherein said iterative repetition is terminated when said difference does not exceed a predetermined tolerance or other suitable criteria.

8. The method of claim 7 wherein said predicted value of said designated rock or fluid property upon termination of said iterative repetition is an error minimized value of said designated rock or fluid property.

9. The method of claim 3 wherein said response model has a plurality of rock and fluid properties as model parameters including said designated rock or fluid property.

10. The method of claim 9 wherein said plurality of rock and fluid properties include elastic rock and fluid moduli.

11. The method of claim 10 further comprising assigning estimated values of said plurality of rock and fluid properties to said model subvolume in addition to said first predicted value of said designated rock or fluid property.

12. The method of claim 3 further comprising providing consistency of the said model subvolume rock and fluid properties with constraints and/or relationships at a location in said geologic volume.

13. The method of claim 3 wherein said designated rock or fluid property is selected from the group consisting of mineral or the matrix modulus, water modulus, oil modulus, gas modulus, frame modulus, frame shear modulus, mineral density, water density, oil density, gas density, porosity, water saturation, oil saturation, and gas saturation.

14. The method of claim 3 wherein said first predicted values of seismic response for said cell are simultaneously calculated from said response model.

15. The method of claim 14 wherein said synthetic traces that are generated from said first predicted values of seismic response are simultaneously compared to the corresponding traces obtained from sets of actual seismic data corresponding to the subterranean geologic volume.

16. The method of claim 3 wherein said plurality of response volumes correspond to different values of angle of incidence.

17. The method of claim 3 wherein said plurality of response volumes correspond to different time of acquisition.

18. The method of claim 3 wherein said plurality of response volumes correspond to different shooting direction.

19. The method of claim 3 wherein said plurality of response volumes correspond to different mode of propagation.

20. A method of characterizing a subterranean geologic volume, the method comprising:

assigning a first predicted value of a rock or fluid property to a cell within a multi-dimensional layered model that is correlated to a subterranean geologic volume;

simultaneously calculating first predicted values of seismic response for multiple angles of incidence for said cell from a response model using said first predicted value of said rock or fluid property and based upon compressional velocity, shear velocity and bulk density;

simultaneously comparing synthetic traces that are generated from said first predicted values of seismic response for multiple angles of incidence to corresponding traces obtained from corresponding multiple angles of incidence of actual seismic data for the subterranean geologic volume to ascertain a difference between said synthetic traces and said corresponding traces;

adjusting said first predicted value of said designated rock or fluid property in response to said difference to create a second predicted value of said designated rock or fluid property, wherein said second predicted value generally reduces said difference; and storing said second predicted value for later use.

21. The method of claim 20 wherein said step of simultaneously comparing involves maintaining consistency between the types, scales and dimensions of said first predicted values of a designated rock or fluid property and said corresponding multiple angles of incidence of actual seismic data.

* * * * *